United States Patent [19]
Kainulainen

[11] Patent Number: 5,841,779
[45] Date of Patent: Nov. 24, 1998

[54] HIERARCHICAL SYNCHRONIZATION METHOD

[75] Inventor: Jukka Kainulainen, Helsinski, Finland

[73] Assignee: Nokia Telecommunications Oy, Espoo, Finland

[21] Appl. No.: 693,164
[22] PCT Filed: Feb. 23, 1995
[86] PCT No.: PCT/FI95/00095
§ 371 Date: Aug. 14, 1996
§ 102(e) Date: Aug. 14, 1996
[87] PCT Pub. No.: WO95/24078
PCT Pub. Date: Sep. 8, 1995

[30] Foreign Application Priority Data

Feb. 25, 1994 [FI] Finland ................................. 940926

[51] Int. Cl.⁶ ..................................................... H04J 3/06
[52] U.S. Cl. .......................................... 370/514; 370/503
[58] Field of Search .................................... 370/503, 508, 370/216, 350, 247, 251, 248, 241, 447, 449, 461, 463, 509, 512, 513, 514, 389, 444, 445, 459; 375/350, 356, 232; 340/825.02, 825.03, 825.01, 825.08

[56] References Cited

U.S. PATENT DOCUMENTS

| | | | |
|---|---|---|---|
| 2,986,723 | 5/1961 | Darwin et al. | 340/825.5 |
| 4,837,850 | 6/1989 | Maisel et al. | 340/825.5 |
| 5,696,799 | 12/1997 | Kainulainen | 375/356 |

FOREIGN PATENT DOCUMENTS

| | | |
|---|---|---|
| 435 395 | 7/1991 | European Pat. Off. . |
| 553 360 | 8/1993 | European Pat. Off. . |
| 94/11965 | 5/1994 | WIPO . |

OTHER PUBLICATIONS

International Telecommunication Union, CCITT, General Aspects of Digital Transmission Systems, Terminal Equipments, Physical/Electrical Characteristics of Hierarchical Digital Interfaces, Recommendation G.703, pp. 1–39, Geneva, 1991.

International telecommunications Union, CCITT, General Aspects of Digital Transmission Systems, Terminal Equipments, Synchronous Frame Structures Used . . . , Recommendation G.704, pp. 1–31, Geneva, 1991.

(List continued on next page.)

*Primary Examiner*—Dang Ton
*Attorney, Agent, or Firm*—IP Group of Pillsbury Madison & Sutro LLP

[57] ABSTRACT

In a hierarchical synchronization method for a telecommunications system employing message-based synchronization, in order that a node can recover from the loss of synchronization: (a) a list is formed for each mode interface unit from the group of interfaces appropriate for synchronization in such a way that of the interfaces connected to neighboring nodes, the list only comprises interfaces connected to a neighboring node which, if selected as the node timing source, does not change the synchronization signature transmitted by the node, (b) the node interface units monitor the operation of the control unit of their own node in order to detect whether the node has lost its control unit, (c) if a synchronization signature received by an interface on the synchronization list changes in such a way that the node outgoing signature should be changed and that change occurs when the interface unit has changed and that change occurs when the interface unit has detected the loss of the node control unit, the interface unit informs the other node interface units of this change, and the interface units thereby delete this interface from the group of interfaces appropriate for synchronization, and (d) if all interfaces are deleted from the group of interfaces appropriate for synchronization before the interface units have detected that the control unit is restored, the interface units start using another failure situation procedure.

8 Claims, 8 Drawing Sheets

OTHER PUBLICATIONS

International Telecommunication Union, ITU–T, Digital Transmission Systems, Terminal Equipments, General, Network Node Interface For the Synchronous Digital Hierarchy (SDH), Series G: Transmission Systems and Media, Recommendation G.707 (Mar. 1996), pp. 1–129.

International Telecommunication Union, ITU–T, General Aspects of Digital Transmission Systems, Network Node Interface for the Synchronous Digital Hierarchy, Recommendation G. 708 (Mar. 1993), pp. 1–16.

International Telecommunication Union, ITU–T, General Aspects of Digital Transmission System, Synchronous Multiplexing Structure, Recommendation G.709 (Mar. 1993), pp. 1–53.

M68HC11 Reference Manual, Rev. 3, Motorola Inc., 1991, Section 9, Asynchronous Serial Communications Interface, pp. 9-1—9-34.

| BIT No. | 87654321 | 87654321 | 87654321 | 87654321 | 87654321 | 87654321 | 87654321 | 87654321 |
|---|---|---|---|---|---|---|---|---|
| | 11111111 | 0Hhhhhhx | 0xxxxxxx | 0xxxxxxx | 0xxxxxxx | 0xxxxxxx | 0xxxxxxx | 0Ccccccc |

Hhhhhh = header xxxxxxx = data to be transmitted

Ccccccc = check sum

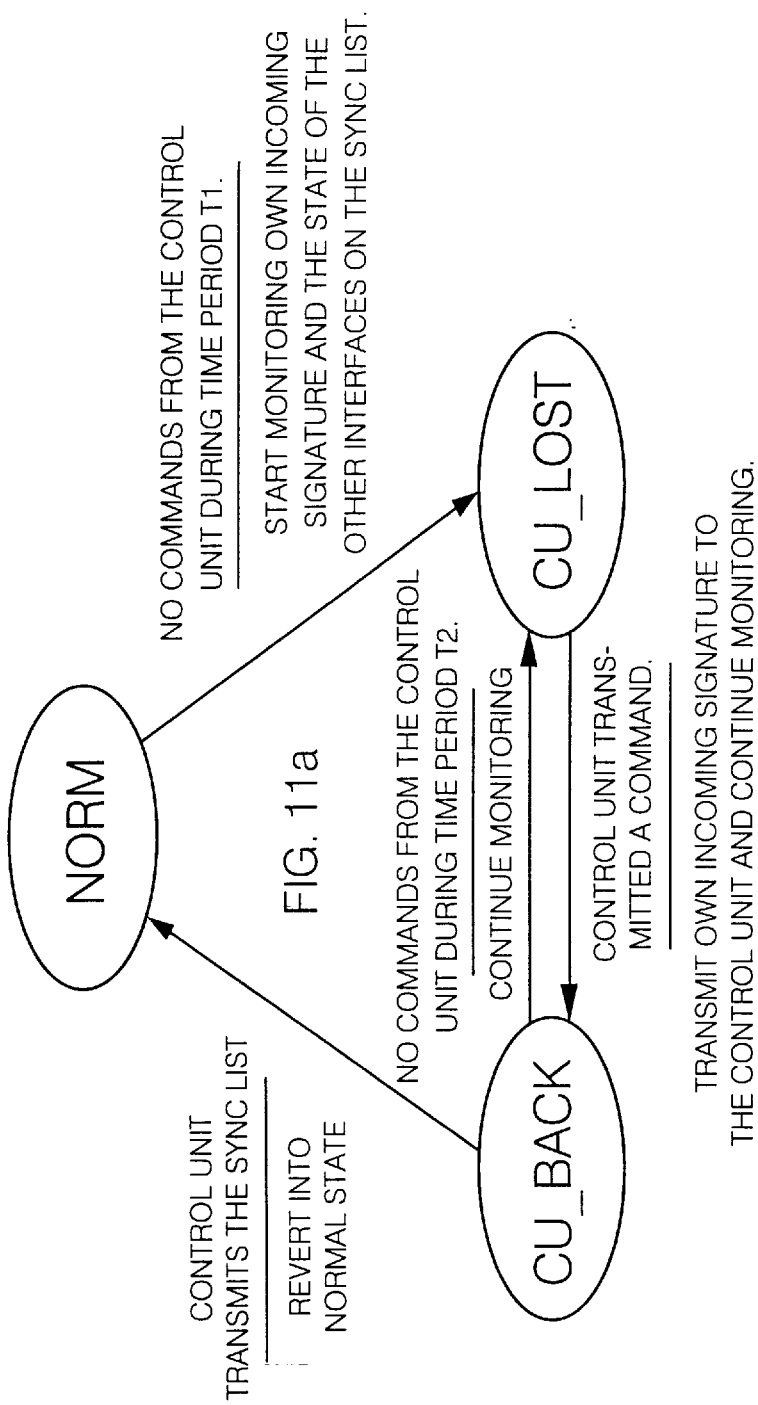

HIERARCHICAL SYNCHRONIZATION METHOD

This application claims benefit of international application PCT/Fl95/00095, filed Feb. 23, 1995.

BACKGROUND OF THE INVENTION

The invention relates to a hierarchical synchronization method which is used in a telecommunications system employing message-based synchronization. The invention also relates to node equipment realizing such a method.

In this presentation, the junction points of the transmission lines in a telecommunication system are called nodes. A node may be any device or equipment capable of affecting clock synchronization, such as a branching or cross-connection means. The latter is used as an example in the more detailed description of the invention below.

Nodes in a telecommunications system utilizing message-based synchronization are interconnected by transmission lines which the nodes use for data transmission. These lines also forward the clock frequency of the transmitting party to the receiving party. Each node selects as the source of its own clock frequency either the frequency of a signal from a neighboring node, the frequency of its own internal clock source, or a frequency brought into the node from an external clock source through a separate synchronization input. In order that all nodes in the system will operate at the same clock frequency, the aim is usually to make the system synchronize itself with a single clock source called a master source. All system nodes connected directly to the selected master source are thus synchronized with the master source while nodes connected to the nodes adjacent to the master source but not directly connected to the master source are synchronized with these adjacent nodes. Accordingly, each node at a greater distance from the master source synchronizes itself with a node one node spacing closer to the master source.

In order that the above-described synchronization hierarchy can be established within the system, the system nodes interchange synchronization messages. These messages contain information by means of which individual nodes are able to select a timing source. The system nodes are prioritized and the system tends to synchronize itself with the clock frequency of a node having the highest level of priority. Normally each priority level is assigned to a single system node. Synchronization messages normally contain information about the origin of the clock frequency of the node transmitting the message and the priority of the node as well as a value describing the quality of the clock signal. Accordingly, a neighboring clock frequency which originates from a desired node and which is of the highest quality can be selected by an individual node as the source of its own clock frequency.

At the system start-up, each node selects its own internal clock source as the source of its clock frequency as it has not yet processed any incoming synchronization messages. After the node has processed the first incoming synchronization messages, it selects the clock frequency of a neighboring node having the highest level of priority as the source of its clock frequency. After all messages have been distributed over the system and the system has achieved a stable state as far as synchronization is concerned, the system has been synchronized hierarchically with the clock frequency of the master source.

FIG. 1 shows a system utilizing message-based synchronization in a stabilized situation. Priorities assigned to the nodes are indicated by numbers within the circles representing the nodes. The smaller the number, the higher the priority of the node. Synchronization messages transmitted by a node n (n=1 ... 6) are indicated by the reference $MSG_n$. Synchronization messages transmitted by different nodes usually differ from each other and depend on the applied message-based synchronization method. The distribution of the clock frequency from the master clock (node 1) to the other system nodes is illustrated by solid lines. Internodal connections drawn by broken lines are not used in a normal situation for system synchronization, but they are available in change situations.

Message-based synchronization is based on a simple principle that the user defines the synchronization hierarchy of the system nodes by assigning each node a dedicated signature indicating the hierarchical level of the node and the system synchronizes itself with the defined master clock independently by utilizing, if required, all existing internodal connections (cf. FIG. 1). If the connection to the master clock breaks, and no alternative connection exists, or if the master clock fails, the system synchronizes itself with a node of the next highest level of hierarchy. FIG. 2 shows a situation where the master clock fails in the system according to FIG. 1. Response to the change in synchronization takes place by message interchange between nodes. When the timing source of the node fails, the synchronization hierarchy is reestablished beginning from the point of break (away from the master device of the system). This takes place, e.g. in such a manner that the node that detects the break first enters into a state of internal timing for a preset time period and then forwards information about the change, thus leading to a new synchronization hierarchy being formed. The resulting hierarchy is usually similar to the original hierarchical structure, but where the failed connection is replaced with an operative one while the structure otherwise remains nearly unchanged.

A network utilizing message-based synchronization is described, e.g. in U.S. Pat. Nos. 2,986,723 and 4,837,850. The former patent discloses a system in which the nodes enter in failure situations into a state of internal timing as described above in order to prevent inappropriate synchronization. The latter patent discloses a system in which resynchronization after a failure situation is based on a separate paging message transmitted in a failure situation and paging for the master node.

The arrangement according to the present invention is intended in principle for all message-based systems of the type described above, a change occurring in the system appearing as a change in the synchronization signature entering the node. The arrangement is especially intended for the method, disclosed in U.S. Pat. No. 2,986,723, referred to below as Self-Organizing Master-Slave synchronization (SOMS).

FIG. 3 illustrates a telecommunications system employing self-organizing master-slave synchronization (SOMS), described in U.S. Pat. No. 2,986,723 referred to above. In this specific case, the system comprises five nodes (or devices) which are indicated by the reference numerals 1 ... 5 according to their level of hierarchy. (Each number forms the SOMS address of the node, and the master node of the network has the smallest SOMS address.) The nodes interchange messages containing such SOMS addresses. In this way the nodes are able to identify each other by means of the address numbers and establish a synchronization hierarchy so that the whole network can synchronize itself with the master node.

As mentioned above, messages transmitted continually in the network are dependent on the applied message-based synchronization method. In addition, the messages are specific for each transmitting node. In the SOMS network a synchronization message contains three different parts: a frame structure, signature and check sum. The SOMS signature is the most important part of the SOMS message. It comprises three consecutive numbers D1 to D3:

D1 is the origin of the synchronization frequency of a node transmitting a SOMS message, i.e. the SOMS address of a node appearing as a master node to the transmitting node.

D2 is a distance to a node indicated by D1. The distance is given as the number of intermediate nodes.

D3 is the SOMS address of a transmitting node.

Each node (or device) compares continuously incoming SOMS signatures with each other and selects the smallest amongst them. In the signature, the different parts D1, D2 and D3 are combined into a single number by placing them in succession (D1D2D3) (for the sake of clarity, a dash will be inserted between the different parts in the text below as follows: D1-D2-D3). Accordingly, a primary criterion for the selection of the smallest address is the SOMS address (D1) of a node appearing as the master node to the preceding nodes, i.e. the node tends to be synchronized with a signal having a frequency originally derived from a node with the smallest possible address. In a stable situation, the whole network is thus synchronized with the same master node (as the master node of the whole network has the smallest SOMS address).

If two or more of the incoming signals are synchronized with the same master code, the one arriving over the shortest path (D2) is selected. The last criterion for selection is the SOMS address (D3) of the node transmitting the SOMS message, which is used for the selection if the incoming signals cannot be distinguished from each other in any other way.

After the node has accepted one of the neighboring nodes as its new synchronization source on the basis of an incoming SOMS signature, it has to regenerate its own SOMS signature. The new SOMS signature can be derived from the selected smallest SOMS signature as follows: the first part (D1) is left intact; the second part (D2) is incremented by one, and the third part (D3) is replaced with the node's own SOMS address.

Each node also has its own internal SOMS signature X-O-X, where X is the SOMS address of the node. If none of the incoming SOMS messages contains a signature smaller than the internal signature, the node uses its own internal oscillator or possibly a separate synchronization input as the source of its clock frequency. Of course, the outgoing SOMS message thereby employs the internal SOMS signature.

The nodes transmit continuously SOMS messages in all directions in order that any changed data in the SOMS signatures will be distributed as rapidly as possible and that they will know the current operating condition of neighboring nodes. The SOMS signatures cannot be compared with each other until the incoming SOMS messages have been accepted and the SOMS signatures have been extracted from the messages.

When the first SOMS message is received from a specific transmission line, the SOMS signature contained therein is accepted immediately for comparison if the message is faultless. When the incoming transmission line has an accepted SOMS signature and faultless messages containing the same signature are received continuously, the situation remains unchanged. If the SOMS message is found to be faulty, the current SOMS signature is retained until three successive faulty SOMS messages have been received. At this stage, the old SOMS signature is no longer accepted for comparison. Waiting for three successive SOMS messages aims at eliminating temporary disturbances.

If no SOMS message is received from the line and there is no line failure, the current SOMS signature is rejected only after a period of time corresponding to three successive SOMS messages. If the line fails totally, the SOMS signature is rejected immediately. If no appropriate SOMS signature is available for comparison, due to disturbances in the incoming signal, the SOMS signature of the transmission line is rejected. A constant-value signature where all parts (D1, D2, D3) have their maximum value (MAX-MAX-MAX) is thereby used in the comparison as the SOMS signature of this incoming transmission line.

When a new changed SOMS signature is detected in an incoming SOMS message, it is accepted immediately for comparison, if the message is faultless. In this way, there will be no unnecessary delays in network changes.

Initially, each node employs its own internal synchronization source, and transmits its own internal SOMS signature X-O-X to the other nodes. This signature is also compared with incoming SOMS signatures. If none of the incoming signatures is smaller than the internal signature, the node continues to use its own internal timing.

In FIG. 3, the SOMS network is shown in an initial state when none of the nodes (or devices) has yet processed any one of the incoming SOMS messages. In all nodes, the highest priority is assigned to the internal SOMS signature of the node as no other signatures have yet been processed. In FIG. 3, the SOMS signatures are indicated beside each node to which they are transmitted, and the selected signature is framed (in the initial situation shown in FIG. 3 all nodes employ their internal timing source). Lines used in synchronization are drawn by a continuous line and standby lines are drawn by a broken line (in the initial situation shown in FIG. 3, all lines are standby lines).

When the nodes start to process the incoming SOMS messages, node 1 retains the use of the internal timing, nodes 2 and 4 synchronize themselves with node 1 on the basis of the signature 1-0-1, node 3 is synchronized with node 2 (2-0-2), and node 5 with node 3 (3-0-3). At the same time, the nodes generate their own new SOMS signatures as described above and provide their outgoing SOMS message with the new signature. The network in a stable situation is shown in FIG. 4. All nodes have synchronized with the master node 1 over the shortest possible path.

If the smallest one of the SOMS signatures entering the node changes or is lost totally when the connection fails, the node selects a new synchronization direction on the basis of the second smallest SOMS signature. Prior to this, however, the node is forced to change over to internal timing, which it retains for a preset time period in order for any faulty signatures occurring in the network to be eliminated. For instance, if node 1 in the situation of FIG. 4 should fail, nodes 2 and 4 would no longer receive the signature 1-0-1, with which they were synchronized. If they now accepted immediately the second smallest SOMS signature, the network would no longer be synchronized with a single master node but a synchronization loop would result. When node 1 fails, node 2 still receives the signatures 1-1-4 and 1-2-3, and node 4 receives the signatures 1-1-2 and 1-2-5, as nodes 3 and 5 have not yet responded to the changed situation. If the second smallest signatures were accepted immediately, node 2 would be synchronized with node 4, and node 4 with node 2. This situation is prevented by the above-mentioned forced state of internal timing, in which the nodes start to use their own internal timing source and transmit their own internal SOMS signature (X-O-X). Nodes which were synchronized with the node now in the state of internal timing detect that a change has occurred in the network and that the SOMS message on which the former synchronization was based is no longer valid, as it has been changed into the internal SOMS message of the neighboring node. As a consequence, the nodes also enter into the forced state of internal timing for a preset time period.

If the master node fails in the case of FIG. 4, the nodes 2 and 4 are immediately forced to enter into the state of internal timing when they lose the incoming SOMS signature 1-0-1. When the nodes 3 and 5 detect the change that has taken place in the nodes 2 and 4, they are also forced to enter into the state of internal timing. When node 2 reverts to the normal state, it receives the internal SOMS signatures (3-0-3 and 4-0-4) from the nodes 3 and 4 and retains the use of the internal timing as the SOMS signatures received from outside are not smaller than its own internal signature (2-0-2). Node 4 is then synchronized with node 2. After having stabilized, the network is in the state shown in FIG. 5, where node 2 is the new master node of the network. If, for example, only the connection between the nodes 1 and 2 breaks (FIG. 6), only node 2 is forced into the state of internal timing. On reverting to the normal state it synchronizes itself with node 4 having a connection to the master node of the network. After the stabilization of the entire network, the synchronization still originates from node 1 despite the break. This is illustrated in FIG. 6.

The node, typically a digital cross-connection device, in the above-described network utilizing message-based synchronization can be realized in different ways in practice, depending on the location of the control unit of the node. (The node control unit is the part controlling the operation of the node equipment and making a list of the node interfaces having connections with neighboring nodes which can be selected as a source of synchronization.) FIGS. 7a to 7d show some of the most general basic structures of a cross-connection device. The control unit is indicated in the figures by the reference, CU, and the units performing cross-connection are also indicated by the reference DCC (Digital Cross-Connect). The node is connected to the network by means of interface units IU (the interface may be, for example, a 2 Mbit/s PCM interface). If units other than the actual interface unit (IU) also comprise interfaces, those units are indicated with the reference IU in brackets.

The node units are connected to two different buses: CBUS and DBUS. The CBUS is a command bus which is used for communication between the node units, and the DBUS is a data bus intended for transmitting, between the different units, data arriving at the cross-connection device (from other network nodes).

In a cross-connection device of FIG. 7a, the control unit CU is a separate unit, and the actual cross-connection is distributed to parallel interface units IU. All interface units are connected to the same fast bus DBUS and they receive all incoming data from which they select their own outgoing data. The control unit CU communicates with the interface units IU only through the command bus CBUS. The interface units operate under the control unit, and they can make decisions on the nodal level only within limits set by the control unit.

In the alternative of FIG. 7b, the control unit CU is located next to the interface units IU and it is connected to both buses. The control unit may then also comprise interfaces to the network and cross-connection functions, but it is the only unit capable of controlling the node.

In the alternative of FIG. 7c, cross-connection is concentrated in its own plug-in unit 71 which is located next to the interface units IU and connected to both buses. This unit receives all incoming data from the bus DBUS, and it forms the outgoing data from the node to the bus ready for the interface units. In this case, the control unit is a separate unit and controls the node through the command bus CBUS as shown in FIG. 7a.

In the alternative of FIG. 7d, all units 72 have both interfaces and cross-connection functions, and each of them may also act as the control unit of the device, but only one at a time.

When a node loses its control unit CU or the decision means situated therein, it should not cause disturbances in the system synchronization, since the interface units processing the timing are still operative. Such a loss may result, for example from a failure in or a change of the control unit. Known message-based synchronization methods cannot, however, handle such a situation.

This problem is prevalent especially in the arrangements of FIGS. 7a to 7c which contain only one dedicated control unit CU. It is naturally possible to provide the control unit with a second, spare unit which takes over after the first unit fails, but such an arrangement will be considerably more expensive.

SUMMARY OF THE INVENTION

The purpose of the present invention is thus to eliminate the above-described drawback and to provide a synchronization method which can continue operating after the synchronization decision means has failed, by utilizing as simple a construction as possible. This object is achieved with the method according to the invention.

The idea of the invention is to maintain the synchronization even after the control unit has been lost as long as the synchronization signatures entering the node do not cause changes in the node's own (outgoing) synchronization signature.

Due to the arrangement according to the invention, the network synchronization cannot change because of a failure in the control unit, its updating or change, even though the- (only) centralized synchronization decision means of the node is located therein.

The arrangement according to the invention can also be used in such a node that comprises a spare control unit, but in such a case the arrangement of the invention is only useful after both control units have been lost.

BRIEF DESCRIPTION OF THE DRAWINGS

In the following, the invention and its preferred embodiments will be described in greater detail with reference to the examples according to FIGS. 7a to 11b in the accompanying drawings, in which:

FIG. 9b shows the realization of a SOMS message in the message of FIG. 9a, FIG. 10 is a diagram illustrating data transmission between interface units of a node, FIG. 11a is a state diagram representing different states of an interface on a synchronization list of a node.

DETAILED DESCRIPTION

Figure 1:
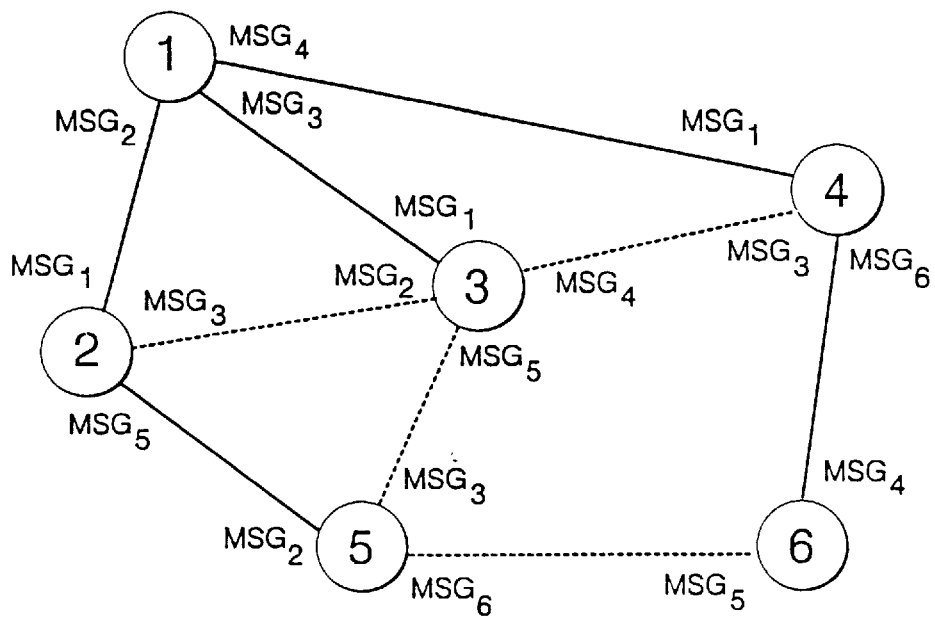
FIG. 1 shows the general configuration of a telecommunications system employing message-based synchronization when the system is in synchronization with the clock frequency of a master source.
Figure 2:
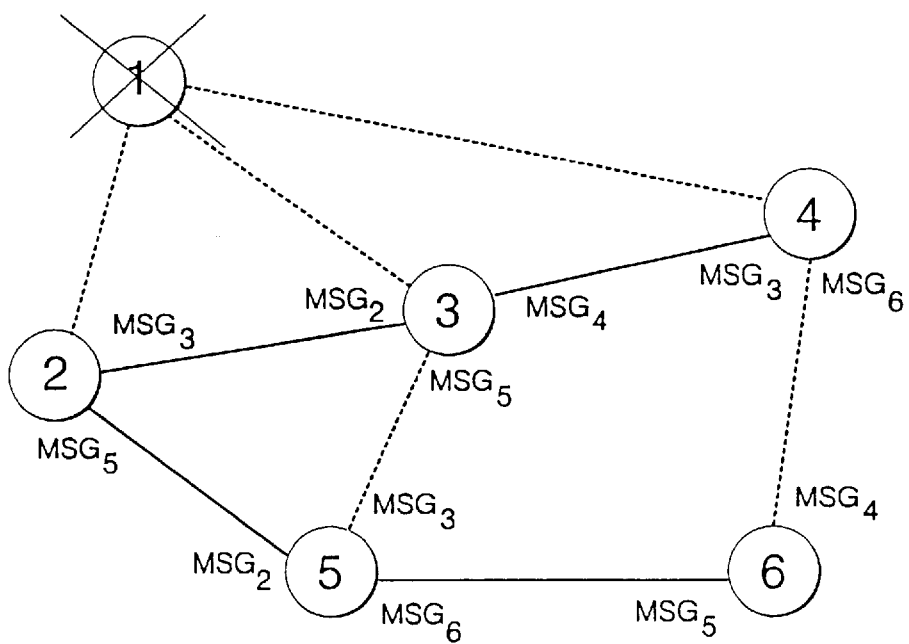
FIG. 2 shows the network of FIG. 1 when the mater source has failed.
Figure 3:
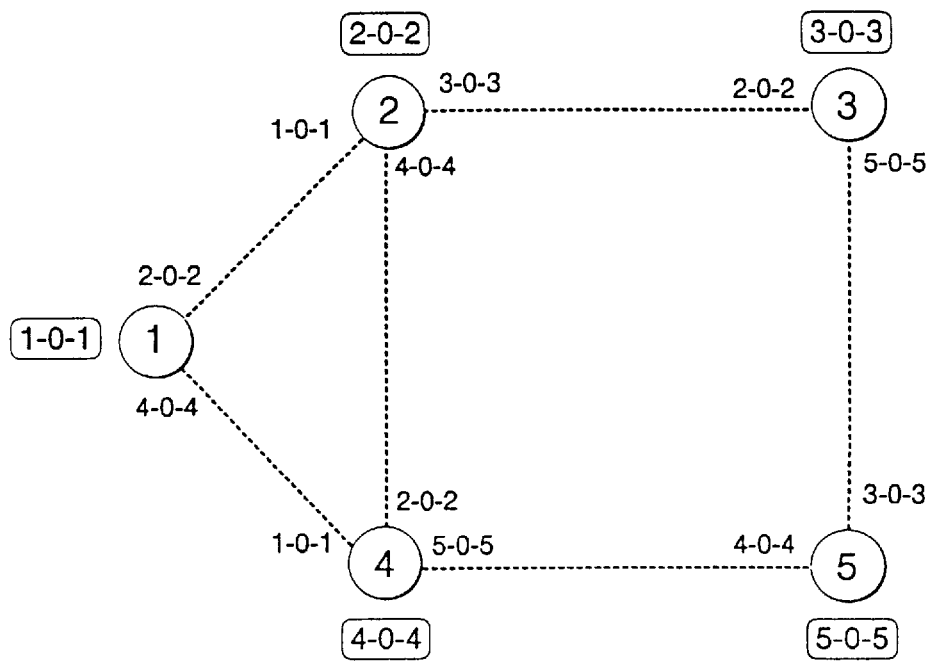
FIG. 3 shows a network employing self-organizing master-slave synchronization (SOMS) in an initial state.
Figure 4:
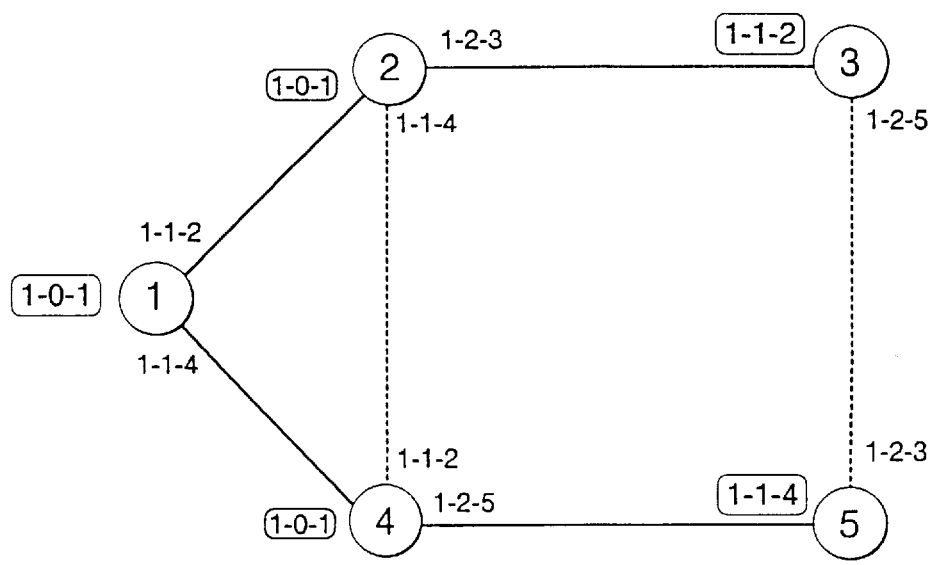
FIG. 4 shows the network of FIG. 3 in a stable state.
Figure 5:
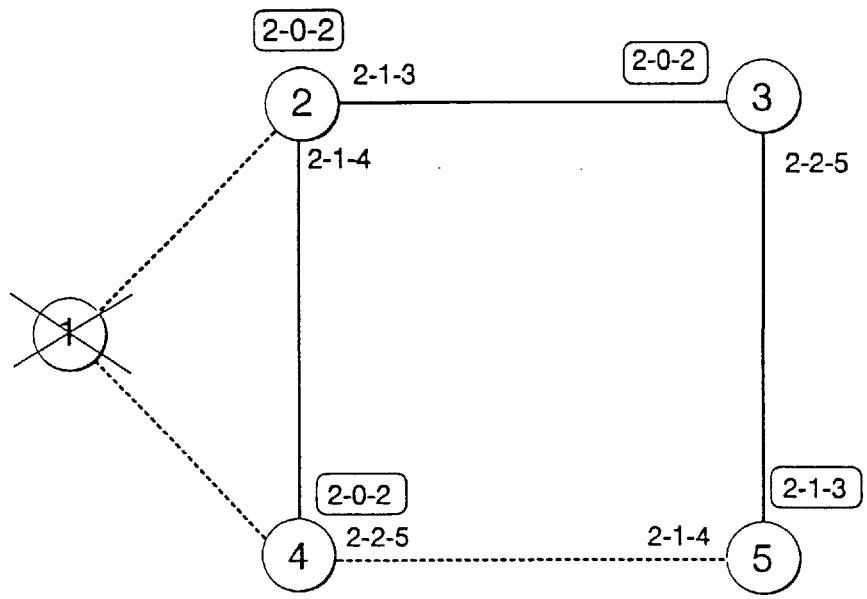
FIG. 5 illustrates the resynchronization of the network of FIG. 4 when the master node has failed.
Figure 6:
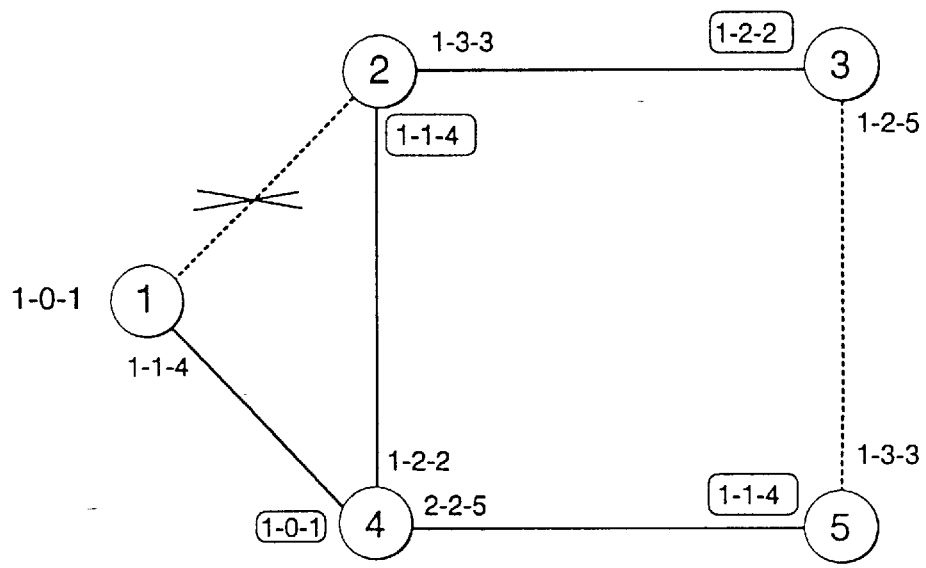
FIG. 6 illustrates the resynchronization of the network of FIG. 4 when a connection between two nodes has failed.
Figure 7A:
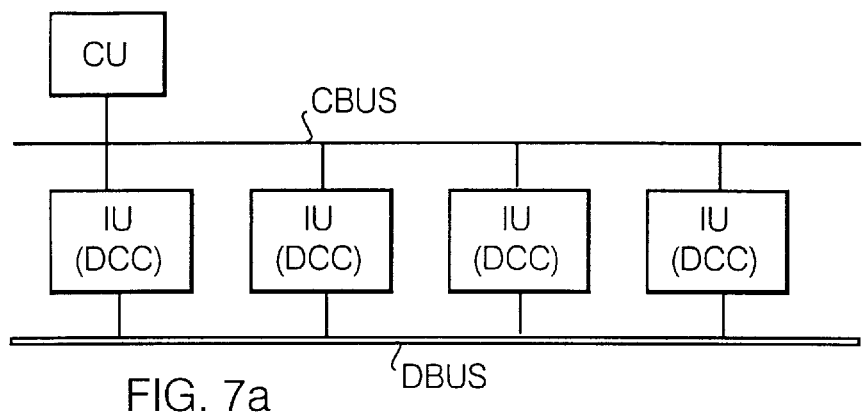
FIGS. 7a to 7d illustrate different alternatives for realizing a cross-connection device acting as a network node.
Figure 7B:
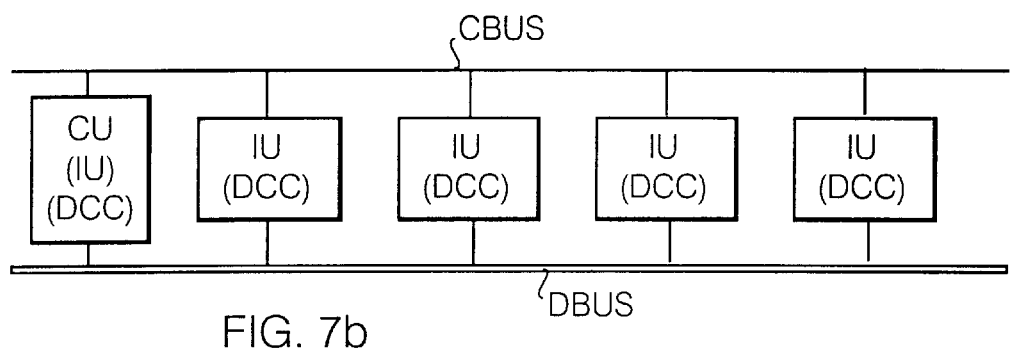
Figure 7C:
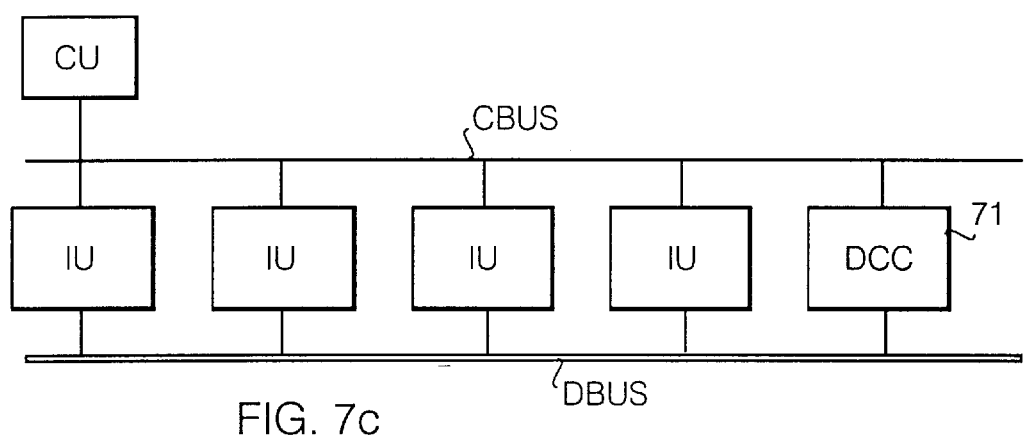
Figure 7D:
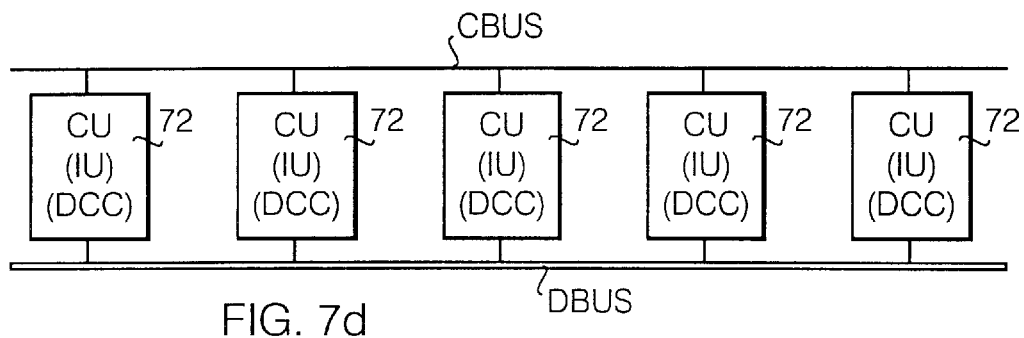

In nodes of FIGS. 7a to 7c, the synchronization operations are distributed in principle in such a way that the control unit CU comprises a message-based synchronization decision means which selects for the node a source with which the node will synchronize itself. This information is transmitted via the command bus CBUS to all interface units IU which handle the actual synchronization. In the following, the operations performed in different parts of a node according to the invention are described in greater detail with reference to FIG. 8 which shows one interface unit IU and a dedicated control unit CU with parts relating to the present invention. One interface unit IU may comprise one or several interfaces A . . . N through which a node is connected accordingly to one or several neighbouring nodes.

The interface unit IU comprises three parts central to the synchronization:

- a signal-processing means 81, which forms the physical interfaces A . . . N and which is connected to the internal databus DBUS of the node. The signal-processing means is responsible for processing the physical signal both for external signals and for the signals of the internal databus,
- a message-processing means 82, which exploits the services of the signal-processing means, processes synchronization messages, monitors the presence of the control unit CU, and informs the other node interface units IU of a change in the synchronization signature, and
- a synchronization means 91, which handles the synchronization in practice, controlled by the message-processing means (controls the signal-processing means for the synchronization signals). (In fact the synchronization means is not very important for the present invention in the embodiment of FIG. 8, since the message-processing means handles the features required for realizing the method according to the invention).

The control unit CU comprises only one main block significant for the invention: a synchronization decision means 84, which handles the synchronization in a centralized manner on the nodal level. Both the control and interface unit are connected to the command bus CBUS through bus servers 92 and 93 known per se. The command bus is operated through server processes. Synchronization has its own commands. Each command consists of a command number on the basis of which it is identified and of a possible parameter portion if data, and not only a command, is also to be transmitted to the interface units.

When the control unit CU (or its decision means) wants to transmit a command, and possibly also data, to one or several interface units IU, it writes down the command number and data in its buffer and calls for the command bus server 92, providing it with information about the location of the buffer containing the message and the destination of the message (either all or only some interface units; each interface unit has its own address on the bus). The command bus server 92 assembles the data, writes this data packet in the buffer, and transmits it via a serial port to the command bus servers of the desired interface units. The command bus server of the interface unit performs error check, disassembles the packet, writes the commands it receives in the buffer and then calls for the unit to which the message/command belongs. If the command relates to message-based synchronization, the command bus server of the interface unit calls for the message-processing means which reads the command and possibly the data received from the buffer and processes it.

When there is no other traffic on the command bus CBUS, the command bus server 92 of the control unit polls the interface units IU in succession. If they need the services of the control unit, they switch on the desired service request bit in their response. When, for example, one of the node interfaces has received a new changed SOMS message, the interface unit switches on the bit indicating this in its response, after which the control unit asks for the changed message in a separate command, and receives it from the interface unit in response to this request command. The interface units may not thus spontaneously transmit anything to the command bus, but they can only transmit in response to polling or a request command or when they have received the right they requested in association with polling to send information. Therefore there can be no collisions on the command bus.

In using, for example, the 68HC11 processor of Motorola, the command bus servers can be realized by means of the built-in serial port of the processor, connected to the bus. The processor provides buffers for transmission and generates interruptions and status flags when the data has arrived and as a result of certain failure situations. However, since the use of the command bus is not related to the actual invention and a person skilled in the art can realize the above-described functions, reference is made, for example, to the M68HC11 Reference Manual (Motorola Inc., 1991), which provides a more detailed description of the subject for those interested in it.

The signal-processing means 81 of the interface unit IU receives a signal from another system node into its interfaces A . . . N, the signal typically being, e.g., a 2048 kbit/s signal according to CCITT recommendations G.703/G.704, the frame of the signal comprising 32 time slots (TS0 . . . TS31) and the multiframe comprising 16 frames. A synchronization message can be transmitted in the frame structure of this signal, for example, in such a way that the synchronization message reserves two bits from some time slot of the frame structure, preferably of the bits of the time slot TS0 (every other frame has a frame alignment signal in the time slot TS0, but in every other frame, bits 4 to 8 are available for national use, wherefore they can be used for the transmission of a synchronization message). If the bits of the time slot TS0 are used, a maximum of three bits remain for some other use, for example for a service channel. The bits for the synchronization message can also be reserved from some other time slot, but the capacity required must then be taken from the capacity reserved for the payload.

When, for example, the aforementioned two bits have been reserved for the synchronization message from a suitable time slot, message is transmitted in this selected channel "one piece at a time" (2 bits per frame).

Figures 8, 9A:
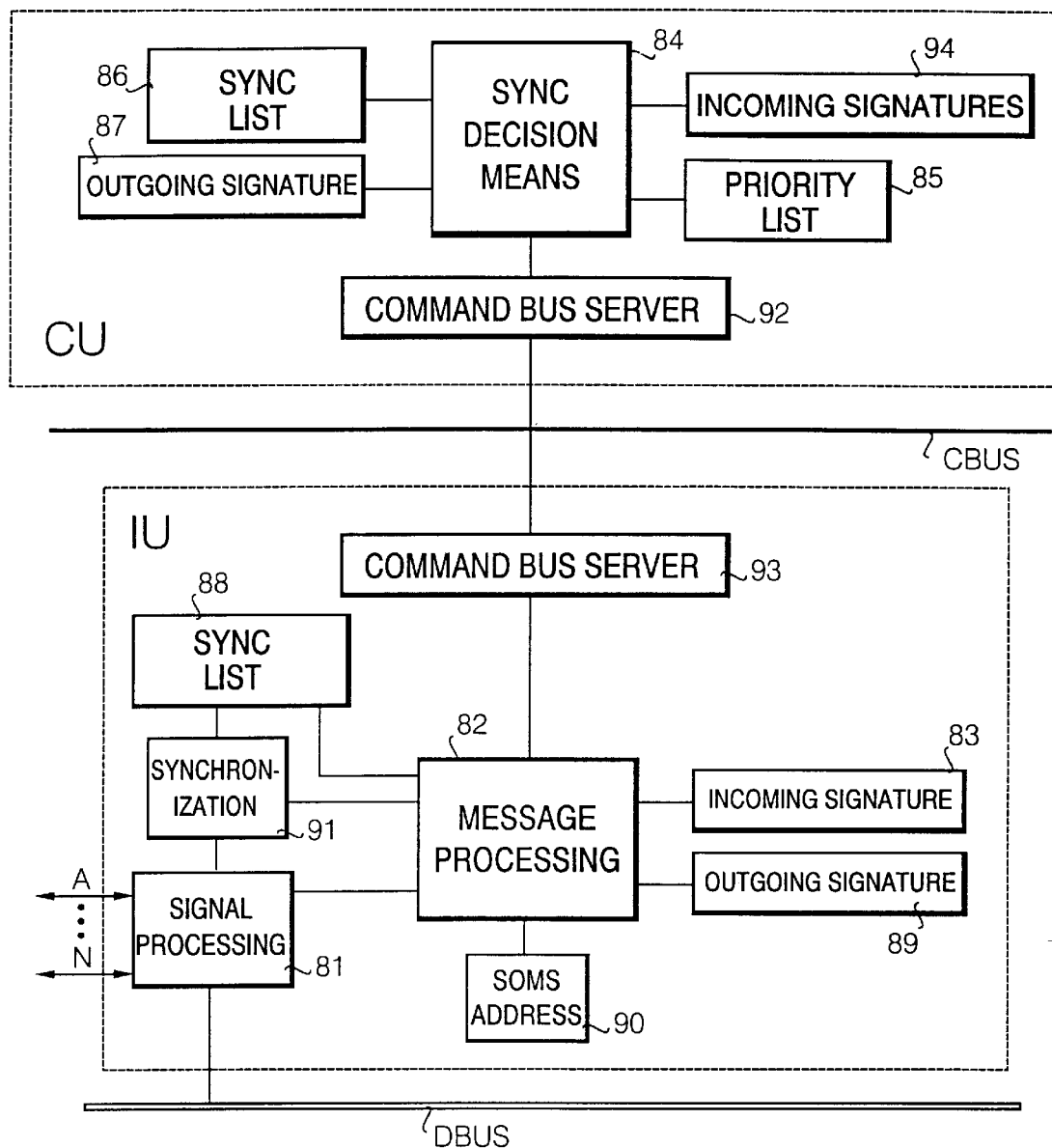
FIG. 8 is a functional block diagram of a control and interface unit of a node employing the method according to the invention.
FIG. 9a shows one possible general structure of a synchronization message.

The general structure of a synchronization message may be, for example, like the one shown in FIG. 9a. In viewing the message in form of series, the actual message begins from the first zero following eight successive number ones (messages are transmitted one after another without a delay). After that, the most significant bit (no. 8) of each byte is zero so that there cannot be eight successive number ones in the frame of the actual message, since this could be confused with the start byte. In the first byte of the actual message, six bits (bits 2 to 7) are reserved for header data and the last bit (x) for user data. The following five bytes contain in bits 1 to 7 user data, and bit 8 is zero. Bits 1 to 7 of the last byte comprise the check sum.

The SOMS signature D1-D2-D3 can be transmitted in such a synchronization message, for example, in the manner described in FIG. 9b. The transmitting buffer is preferably arranged to have the same length with the message (8 bytes), since during normal operation the receiver always finds then the beginning of the message from the same place in the buffer, and there is no need to go through the buffer in order to find the starting point of each message.

If the telecommunications system employing the method according to the invention is formed of, for example, an SDH network-where signals received by a node are as described in CCITT recommendations G.707, G.708 and G.709, the synchronization message can be transmitted in the part of an STM-N signal (N=1,4,16 . . . ) frame which is especially reserved for synchronization data (overhead area of an STM-1 frame).

The signal-processing means 81 extracts the bits relating to synchronization from the frame structure of the signal it has received and forwards the bits to the message-processing means 82 which checks whether the message is faultless and stores the signature found to be faultless in a storage location denoted by reference numeral 83.

The message-processing means 82 forwards the signatures arriving at the interface unit via the command bus CBUS (as described above) to the synchronization decision means 84 in the control unit CU, the decision means storing them in a storage location 94 in which signatures arriving from other interface units are also stored. The decision means forms of these signatures a ready priority list in which each node interface (interface number) is in the place determined by its incoming signature in such a way that the top of the list is occupied by the interface corresponding to the selected signature, the next one is the interface receiving the signature on the second highest level, etc. By means of this priority list, the decision means forms for the node a separate synchronization list comprising the top of the priority list, for example the first three interfaces. The decision means stores this synchronization list in the memory, the storage location in question being denoted by reference numeral 86.

According to the invention, a synchronization list is formed in a node always in such a way that possibly except for the interface corresponding to the internal oscillator, the list only comprises interfaces which require no change in the outgoing synchronization message. The significance of this fact will become apparent below. For example in a SOMS network the synchronization list should be made up in such a way that in addition to the signature which has been selected (on top of the list), the list only comprises interfaces which receive a signature having the same level as the selected signature. (In two signatures of the same level, the parts D1 are similar and the parts D2 are similar, wherefore the outgoing SOMS signature does not change no matter which of the synchronization signatures of the same level is used selecting the synchronization source.) The following table shows one example of forming a priority list and a synchronization list on the basis of signatures entering a node.

| Incoming signatures | | Priority list | | Synchronization list | |
| --- | --- | --- | --- | --- | --- |
| Interface | Signature | Level | Interface | Level | Interface |
| 1 | 2-4-7 | I | 6 | I | 6 |
| 2 | 2-4-9 | II | 3 | II | 3 |
| 3 | 2-3-12 | III | 1 | III | INT |
| 4 | 2-4-14 | IV | 2 | | |
| 5 | 2-4-9 | V | 5 | | |
| 6 | 2-3-10 | VI | 4 | | |
| INT | 20-0-20 | VII | INT | | |

The basic data for forming a synchronization list consists of the incoming signatures and the SOMS address (20) of the node. The incoming signatures also include an interface INT which corresponds to the node-internal oscillator, the frequency of which can be used (in failure situations) as the timing source. The internal signature is formed as described above on the basis of the node's own SOMS address. The timing source can also be provided by a direct external synchronization input which will receive the signature determined by the user when the incoming clock signal will be in order.

A priority list is formed, as described above, by placing all timing sources in an order of quality on the basis of their signatures. The first two interfaces (6 and 3) have been selected from this list onto the three-level synchronization list, since when the node synchronizes itself with the signals arriving at these interfaces, the outgoing SOMS signature remains the same (2-4-20). The third level of the synchronization list is occupied by the internal timing which is always used to fill unoccupied places on the synchronization list (the temporary use of the internal timing in a change situation is not as dangerous as using an inappropriate interface for synchronization, whereupon the timing could get in disorder for a while).

The decision means 84 of the control unit forms the node outgoing signature on the basis of the signature transmitted by the selected synchronization source (which is the node connected to the interface on top of the synchronization list) and stores it in the memory (storage location 87). The decision means transmits both the synchronization list and the outgoing signature to the message-processing means 82 of the interface units, these means storing them in the memory (storage locations 88 and 89). In a SOMS network, the control unit also transmits the SOMS address of the node to the interface units, so that each interface unit can independently change over to the internal signature transmission (storage location 90).

If the control unit CU (or only its decision means 84) fails, or if it is removed from the equipment for example due to a change or updating, the node can no longer form the above-described synchronization list. When the control unit (or only its decision means) is lost, the interface units IU continue their normal operation, i.e. they will be synchronized with the same source and transmit the last signature sent by the decision means 84. If after this there should occur in the network changes affecting the network synchronization, the node can no longer respond to these changes which may lead to the faulty synchronization of the network. When the control unit (or only its decision means) is lost, another alternative can be that the interface units would immediately enter into the internal timing (they would transmit the corresponding signature) and would retain this state until the control unit would be in order again. The node will then always be synchronized with a different frequency than the rest of the network, and the network synchronization can possibly break at the node if this node were the only connection between the two different parts of the network.

To avoid such situations, the command bus servers 93 of the interfaces continuously monitor the control unit CU in order to detect if it would "disappear". This may be realized for example in such a way that each command bus server 93 continuously monitors the incoming commands from the command bus. The control unit continuously polls the interface units, and if the command bus server 93 of an interface unit does not receive any message from the control. unit during a preset time period, it assumes that the control unit is lost and sets a flag reserved for this purpose. The message-processing means 82 monitors the state of this flag, and when it detects a change therein it enters into the control-unit-lost state.

In principle, the interface units then continue normally their externally visible operation, but they also begin to monitor the situation. The aim is to be synchronized with an external signal as long as it is possible and to transmit a corresponding outbound message.

Monitoring is performed by the message-processing means 82 by examining the synchronization messages received by the interfaces on the synchronization list. If a change that would cause an alteration also in the outgoing signature occurs in the signature contained by the message, the message-processing means prevents synchronization with this source even if synchronization were possible in a normal situation. For example, in a SOMS network, such a change is a change occurring in the first or second part (D1 or D2) of the synchronization signature, since it is reflected on the outgoing signature. The synchronization is prevented since once the control unit is lost, it is no longer possible to form and transmit a new outgoing signature to all interface units. When the message-processing means detects that a synchronization signature received by an interface on the synchronization list has changed in the aforementioned manner from the form it had when the control unit was lost, it sets a flag to inform the other interface units that the signal of the interface must no longer be used for synchronization. The flag is set by changing the state of a status bit determined in the frame structure of the bus DBUS to an opposite state. As a result, the message-processing means of each interface unit deletes this interface from the synchronization list or marks it in some other manner as inappropriate for synchronization.

Figure 10:
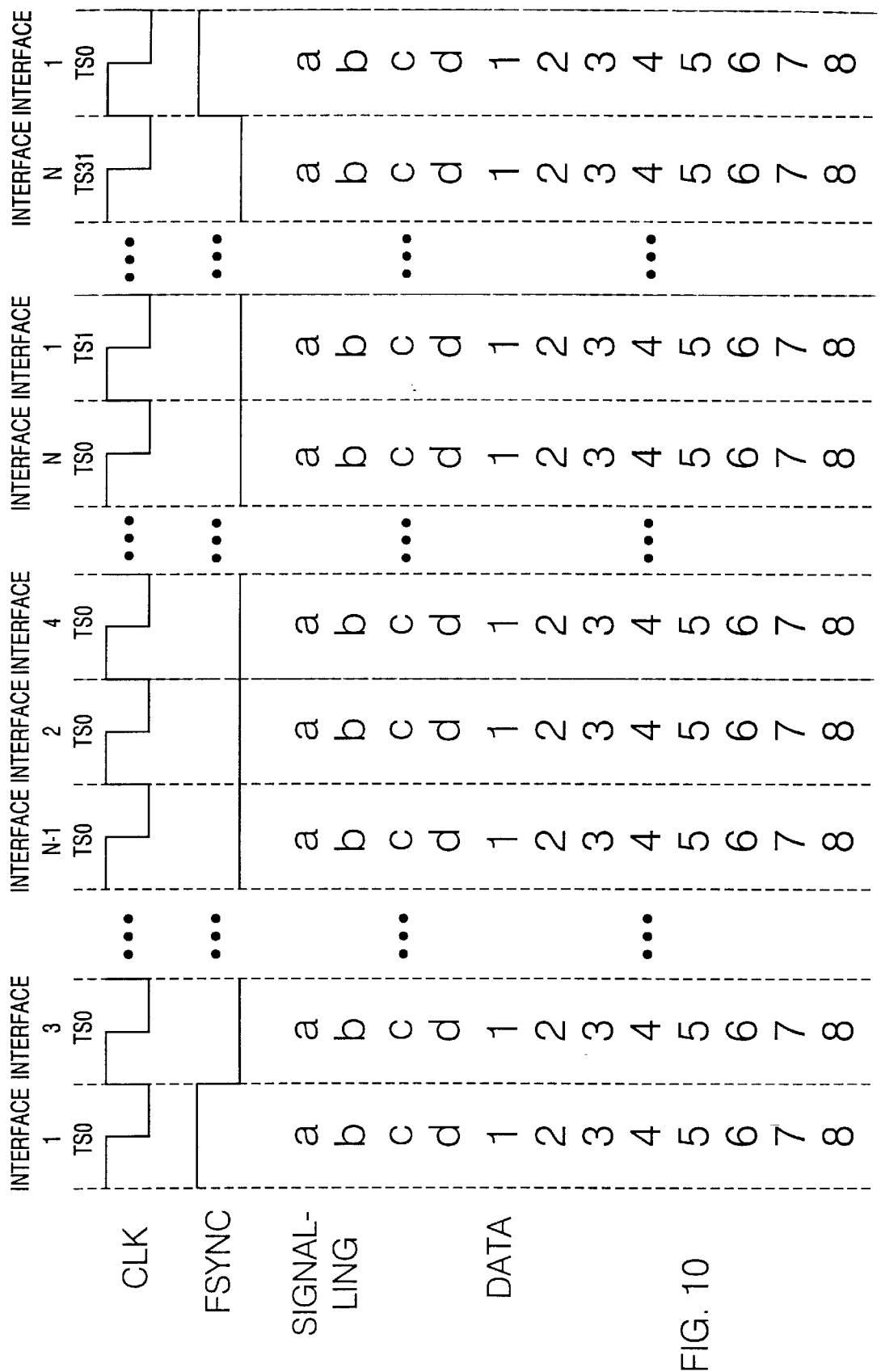

FIG. 10 shows in greater detail a frame structure used on the databus DBUS in a case where the signals transmitted between the nodes are 2048 kbit/s signals according to CCITT recommendations G.703/G.704.

Signals arriving at a node are interleaved directly onto the databus (without adding any frame structure). The bus has its own frame alignment signal FSYNC by means of which the desired data can be found in synchronization with the clock pulse CLK. In practice, the signal-processing means 81 writes the data intended for each interface to the databus from where each interface unit reads all data into its RAM buffers (not shown in the figure) from where it selects the outgoing data according to its cross-connection specifications. Signalling bits, four in number, are indicated in the figure by the references a . . . d. There are in turn eight data bits (1 . . . 8). The data bits comprise in turn the data of the time slots of each signal arriving at the equipment, and the signalling bits comprise the signalling bits of the time slots in question. The interfaces and the time slots change according to the figure; the first ones are time slots zero (TS0) of uneven interfaces, the next ones are time slots zero (TS0) of even interfaces, then time slots one (TS1) of uneven interfaces, etc., and the last one is time slot TS31 of the last even interface. The signalling bits a to d of the time slots TS0 and TS16 are used for the communication between the interface units. When the synchronization signature received by an interface changes in such a way that the outgoing signature should be altered to correspond to the new signature, the message-processing means changes the signalling bit b of the time slot TS16 from zero to one, and the other interface units thereby detect the change and act as described above.

All the interface units IU of the node monitor thus the statuses of the interfaces on the synchronization list. When all interfaces that were originally on the list have informed the interface unit of a change in their synchronization signature or a failure in the incoming signal, the synchronization list no longer comprises any interface appropriate for synchronization, and the node thereby changes over to the state of internal timing according to its normal procedure.

All interface units IU must thus monitor the statuses of the interfaces on the synchronization list so that they can begin simultaneously to transmit a signature according to the internal timing.

Figure 11B:
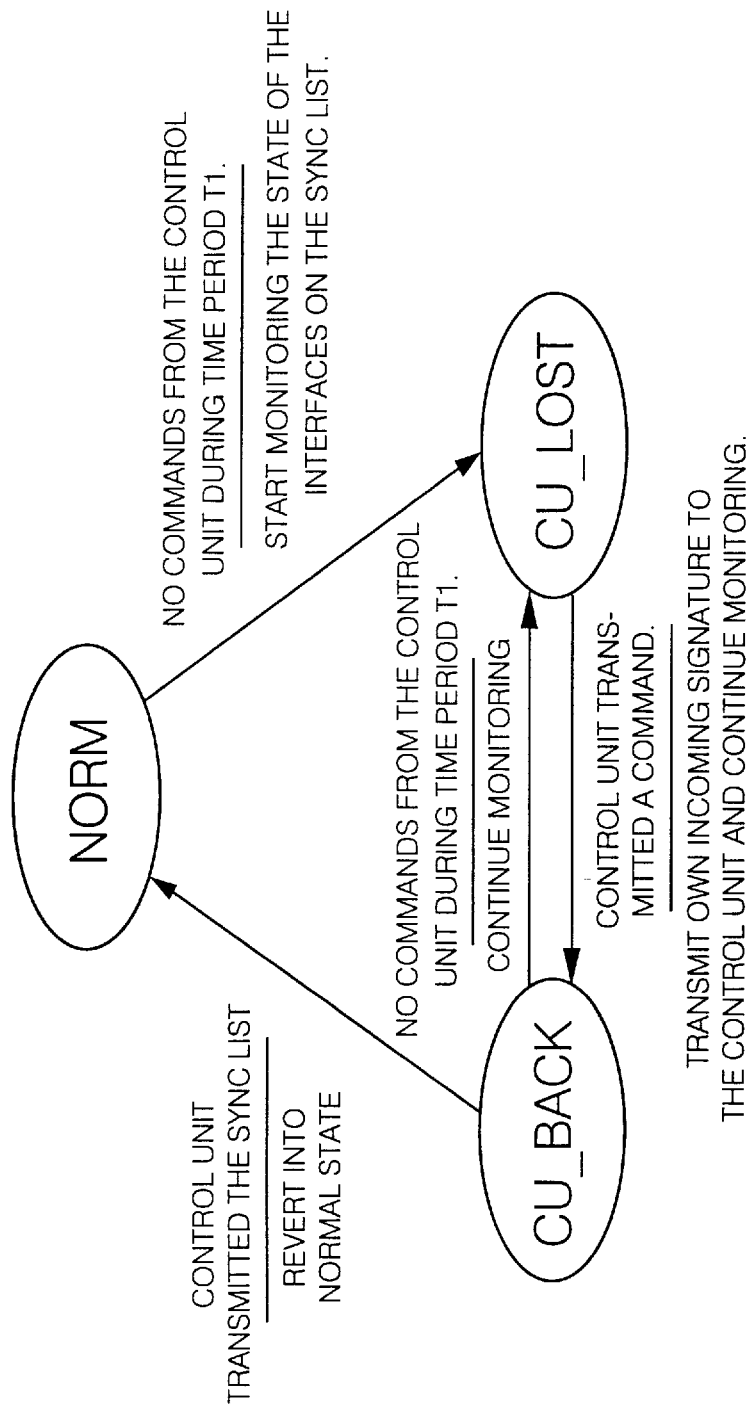
FIG. 11b is a state diagram representing different states of an interface not on a synchronization list of a node.

FIGS. 11a and 11b illustrate the above-described operations as a state diagram from the point of view of an interface unit. FIG. 11a shows the situation for an interface on the synchronization list, and FIG. 11b for an interface not on the synchronization list. The state diagram comprises three states, and the transitions from one state to another occur according to the above-described conditions. Beside each transition and above the horizontal line, the figures show the event bringing about the transition, and below the horizontal line the operations performed as a result of the transition.

In a normal state NORM, the control unit CU is in order and the node operates normally, as described above for example for the SOMS network with reference to FIGS. 3 to 6. A transition to the control unit lost state CU_LOST takes place if the time that has passed since the last command was received from the control unit exceeds a preset time T1. The message-processing means then begin to monitor the signatures received by the interfaces on the synchronization list.

When the control unit CU is restored, the process comprises for the interface one intermediate state CU_BACK into which the interface enters as soon as the first command or polling is received from the restored control unit. When this intermediary state is entered, the message-processing means of each interface unit transmits its own incoming synchronization signatures to the decision means of the control unit (as described above, by switching on first the bit corresponding to the changed signature in the polling response and by providing the new signature in response to a separate request command by the decision means). The decision means forms a new synchronization list after it has received the incoming message of all interface units. It is thereby possible to immediately make a correct decision concerning synchronization. If all interface units hove not informed the control unit of their changed signature within a preset short time period, the control unit asks the interface units for this information. If, however, no commands are received from the control unit in the state CU_BACK within a preset time period T2 after this state has been entered into, the interface enters again into the control unit lost state CU_LOST, after which the operation continues again as described above.

In a normal restoring process, however, the restored control unit transmits a new synchronization list to the interface unit, which then immediately enters again into the normal state NORM, and the operation of the node continues as usual.

According to another embodiment of the invention, the control unit may ask separately for the incoming signatures of all interface units immediately after its start-up (the interface units do not give a separate notice about a change in their signature).

As the aforementioned description shows, realizing the method according to the invention requires the node equipment to have the following four characteristics:

1. The interface units have available the synchronization list of the node.
2. The interface units can detect the loss of the node control unit.
3. The interface units can inform each other of whether the signals arriving at their interfaces are appropriate for synchronization.
4. The interface units can either form the synchronization signature corresponding to the node internal timing, or they know the final form of the signature (e.g. SOMS network).

The above-described preferred embodiment may be utilized to form another, more simplified embodiment, where the node interface unit monitors the operation of the decision-means in the same way in order to detect whether the node has lost its decision means. If the synchronization signature received by the interface connected to the selected timing source changes as described above when the interface unit has detected that the node has lost its decision-means, the interface unit informs the other node interface units of this change as described above, and the interface units thereby start using the failure situation procedure known per se (e.g. transition into internal timing) in order to "find" a new synchronization source for the node. In this embodiment, the interface units thus need only the outgoing synchronization signature (not the synchronization list) in a failure situation. Neither is there any need to update the synchronization list since the interface units change over to the normal failure situation procedure as soon as the selected synchronization signature has been found to change in such a way that the outgoing synchronization signature can no longer be derived from it.

According to the preferred embodiment of the invention, monitoring can be continued even after all the interfaces have been deleted from the synchronization list. If the message-processing means then detects that the signal of one of the interfaces previously on the synchronization list is faultless and the synchronization signature has changed to correspond to the previously (before the change) received signature (or another signature from which the previously outgoing signature can be derived), it sets a flag (as described above) to inform the other interface units that the signal of the interface can again be used for synchronization. All the interface units thereby start transmitting again the original signature until the signature again changes in such a way that the outgoing signature should be changed, or until the control unit is back in working order. The node responds to these events in the manner described above.

The discussion above relates to the operation in case of a change in the synchronization signature. It should also be noted that the failure of an incoming transmission line/signal is a similar event for the invention. If a line fails, it corresponds to the changing of the signature to the worst possible form. When the line is again in order, its signature changes to the signature received from the line after the possible initial handshakings. Thus, when the appended claims refer to the changing of the synchronization signature, it must also be understood to comprise a situation where a transmission line or a signal fails.

Even though the invention is described above with reference to the examples according to the accompanying drawings, it is clear that the invention is not restricted thereto, but it may be modified within the inventive idea disclosed above and in the appended claims. Even though one example, relating to the realization of the aforementioned four characteristics, is described above, a person skilled in the art may vary the more detailed realization of the node in many ways without departing from the spirit of the invention. The failure situation procedure known per se is also different depending on the type of the synchronization method used. It is not necessary to have a separate synchronization list, but a part of the priority list can be used as the synchronization list. It is also possible to use only one source, whereupon the control unit selects for use always the best source and the other sources are not written down on any list. In principle, this corresponds to a synchronization list of only one level.

I claim:

1. A hierarchical synchronization method for a telecommunications system employing message-based synchronization and having a plurality of nodes which are interconnected by transmission lines and which include a centralized control unit for making decisions concerning node synchronization, and respective interface units forming respective interfaces by which each respective node is connected to others of said nodes, comprising the steps of:

said nodes interchanging signals containing synchronization messages each having a respective synchronization signature which indicates the priority of the corresponding signal in an internal synchronization hierarchy of said system, and which signature is formed in each respective node in said control unit;

forming a list for each node interface unit from said interfaces, of a group of interfaces appropriate for synchronization, in such a way that of those of said interfaces which, for a respective said node, are connected with respective neighboring ones of said nodes, the respective list only comprises interfaces connected with a neighboring node which, if selected as a node timing source, does not change the synchronization signature transmitted by the respective node;

monitoring by each said node interface units of operation of the respective said control unit of their own said node, in order to detect if their own said node has lost its control unit;

if a synchronization signature received by an interface on a respective said synchronization list changes, in a change, in such a way that the signature outgoing from the respective node should be changed and said change occurs when the respective interface unit has detected a loss of the control of the respective node, the respective interface unit informing the interface units for the others of said nodes of this change, and the interface units in response deleting this interface from the group of interfaces appropriate for synchronization; and if, as a result of said deleting, all interfaces are deleted from a respective said group of interfaces appropriate for synchronization before the interface units have detected that the respective control unit is restored, the interface units starting to use a failure situation procedure to find a new node synchronization source, and the respective node outgoing signature thereby changing to correspond to said failure situation procedure.

2. The method according to claim 1, wherein said monitoring includes:

the centralized node control unit continuously polling the interface units; and an interface unit detects that a node has lost its control unit if that interface unit has not received any polling message from the control unit during a present time period.

3. The method according to claim 1, wherein:

each said synchronization list also comprises as a last item, the interface corresponding to an oscillator of the respective node.

4. The method according to claim 1, wherein:

if, in a situation where all interfaces have been deleted from the respective group of interfaces appropriate for synchronization of a respective said node and where the control unit remains lost, the respective interface unit detecting that an interface previously on the respective synchronizing list receives again a synchronization signature from which a respective previously valid outgoing synchronization signature can be derived, the respective interface unit informing the interface units for the respective others of said nodes of this change, and the respective said node then being synchronized with a signal arriving at the respective interface, and the interface units start transmitting again said previously valid outgoing synchronization signature.

5. A hierarchical synchronization method for a telecommunications system employing message-based synchronization and having a plurality of nodes which interconnected by transmission lines and which include a centralized control unit for making decisions concerning node synchronization, and respective interface units forming respective interfaces by means of which each respective node is connected to others of said nodes, comprising the steps of:

said nodes interchanging signals containing synchronization messages each having a respective synchronization signature which indicates the priority of the corresponding signal in an internal synchronization hierarchy of said system, and which signature is formed in each respective node in said control unit;

the node interface units each monitoring operation of the control unit of their own node, in order to detect if the respective node has lost its control unit;

if a synchronization signature received by a respective said interface connected to a respective timing source changes, in a chance, in such a way that the signature outgoing from the respective node should be changed, and said change occurs when the respective interface unit has detected a loss of control unit for the respective node, the respective interface unit informing the respective interface units for the others of said nodes of this change, and the respective said interfaces thereby, starting to use a failure situation procedure in order to find a new synchronization source for the respective node, and the respective node outgoing signature changing to correspond to said failure situation procedure.

6. The method according to claim 5, wherein:

if, in a situation where the interfaces have already started using said failure situation procedure in order to find a new synchronization source for the respective said node, the respective said interface unit detects that a synchronization signature received by an interface connected to the previously selected timing source changes again in such a way that the previously outgoing synchronization signature can be derived from said synchronization signature, the respective said interface unit informing the other node interface units of this change, and the respective said node thereby being synchronized with the signal arriving at the respective said interface, and said interface units starting transmitting again said previously outgoing synchronization signature.

7. A node equipment for a telecommunications system employing message-based synchronization and comprising a plurality of nodes interconnected by transmission lines, said node equipment comprising:

a centralized control unit for making decisions concerning synchronization of said nodes;

interface units forming interfaces by means of which each said node is connected to others of said nodes; said nodes being arranged for interchanging signals containing synchronization messages, each with a synchronization signature which indicates the priority of the respective signal in an internal synchronization hierarchy of the system, and which is formed in said control unit (IU);

means arranged in said control unit for forming a synchronization list for the respective said interface unit of each node, from respective group of interfaces appropriate for synchronization, in such a way that, of the interfaces connected to respective neighboring nodes, the respective list only comprises interfaces connected to a neighboring node which, if selected as a node timing source for the respective node, does not change the synchronization signature transmitted by the respective node;

respective monitoring means arranged in the respective said interface units for monitoring operation of the respective control unit in order to detect whether the respective node control unit is operative;

informing means arranged in each of said interface units to provide a message for informing to interface units for respective others of said nodes of a change in a synchronization signature received by an interface on a respective synchronization list;

deletion means arranged in the respective said interface units for deleting an interface from the respective group of interfaces appropriate for synchronization in response to receipt of a respective said message; and means for starting a failure situation procedure in response to deletion of a last interface on a respective synchronization list from that list, and in response to information, provided by the respective said monitoring means, that the respective control unit is no longer operative.

8. A node equipment for a telecommunications system employing message-based synchronization and comprising a plurality of nodes interconnected by transmission lines, said node equipment comprising:

a centralized control unit for making decisions concerning node synchronization;

interface units forming interfaces by means of which each said node is connected to others of said nodes;

said nodes being arranged for interchanging signals containing synchronization messages each with a respective synchronization signature which indicates the priority of the corresponding signal in on internal synchronization hierarchy of said system, and which is arranged to be formed in said control unit;

monitoring means arranged in said interface units for monitoring the operation of the respective said control unit in order to detect whether the respective said node control unit is operative;

informing means arranged in said interface units to provide a message for informing said interface units for respective others of said nodes of a change in a synchronization signature received by an interface connected to a selected timing source; and means for starting a failure situation procedure in response to said message and in response to information, provided by said monitoring means, that the respective said control unit is no longer operative.

\* \* \* \* \*